United States Patent [19]

Plank et al.

[11] 4,346,441

[45] Aug. 24, 1982

[54] RANDOM ACCESS MEMORY SYSTEM FOR EXTENDING THE MEMORY ADDRESSING CAPACITY OF A CPU

[75] Inventors: Odas P. Plank; Richard A. Slater, both of Nashua, N.H.; Steven G. Taibbi, Beverly, Mass.

[73] Assignee: Honeywell Information Systems Inc., Waltham, Mass.

[21] Appl. No.: 144,813

[22] Filed: Apr. 29, 1980

[51] Int. Cl.³ .............................................. G06F 13/06
[52] U.S. Cl. ................................................... 364/200
[58] Field of Search ... 364/200 MS File, 900 MS File; 365/230

[56] References Cited

U.S. PATENT DOCUMENTS 3,818,459  6/1974  Vrablik .............................. 364/200
4,056,848  11/1977  Gilley ................................. 364/900

Primary Examiner—James D. Thomas
Attorney, Agent, or Firm—Faith F. Driscoll; Nicholas Prasinos

[57] ABSTRACT

A logic memory addressing system requiring minimal central processing unit (CPU) control is provided for extending the memory addressing capacity of a CPU. A logic control system simplistic in design and including a logic decoding unit responds to control words issued by the CPU by way of control and address busses to randomly access memory words, and to effect the exchange of information between the memory unit and a data bus.

5 Claims, 1 Drawing Figure

4,346,441

RANDOM ACCESS MEMORY SYSTEM FOR EXTENDING THE MEMORY ADDRESSING CAPACITY OF A CPU

FIELD OF THE INVENTION

The invention relates generally to random access memory systems, and more particularly to a simplistic logic memory addressing system for extending the memory addressing capacity of a central processing unit (CPU).

PRIOR ART

Serial type buffers such as FIFO (first-in-first-out) buffers, delay lines, and LIFO (last-in-first-out) buffers have long been used to address plural words through the use of a single address. While a limited addressing capacity partially was overcome, the desired data words could not be randomly accessed. Rather, the data words had to be received in the order that they were loaded into the buffer, and segregated into secondary buffers to simulate a random access. Such a simulation incurs unnecessary complexity.

SUMMARY OF THE INVENTION

A logic memory addressing system is provided for extending the memory addressing capacity of a central processing unit (CPU).

More particularly, a logic control system of simplistic design including a logic decoding unit is responsive to control words and memory addresses received from a CPU by way of control and address busses, respectively. The decoding unit requires a maximum of five CPU memory addresses to control the loading of address registers from a data bus, and to selectively increment the address registers to sequentially address memory locations beginning from any address location of a random access memory (RAM). The decoding unit further controls the transfer of information between the RAM and the data bus during data read and write operations.

DESCRIPTION OF THE DRAWINGS

For a more complete understanding of the present invention and for further objects and advantages thereof, reference may now be had to the following description taken in conjunction with the accompanying drawing in which.

DESCRIPTION OF THE PREFERRED EMBODIMENTS

Figure 1:
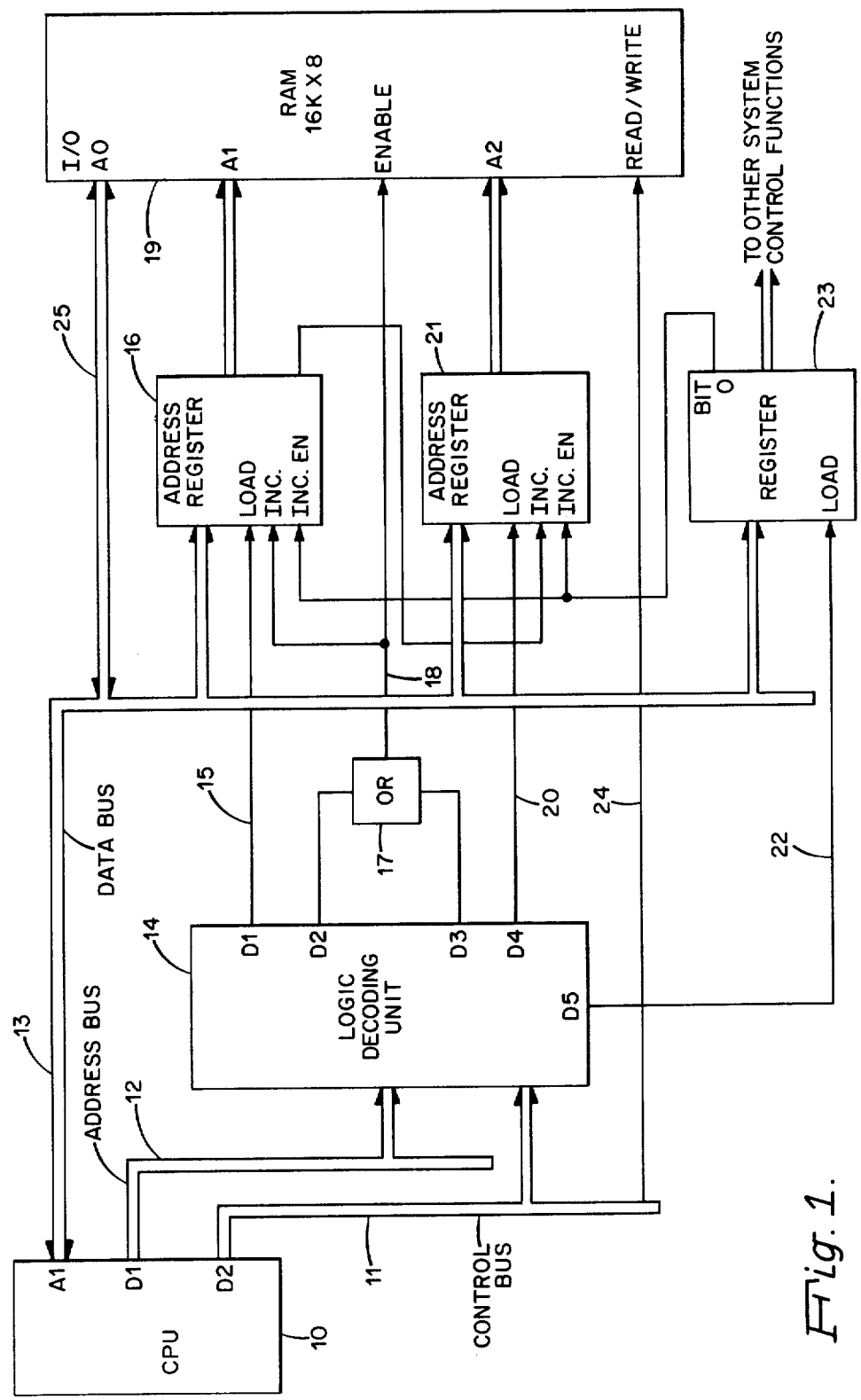
FIG. 1 is a functional block diagram of a logic memory addressing system embodying the invention.

FIG. 1 illustrates in functional block diagram form a preferred embodiment of the invention.

Referring to FIG. 1, the D1 and D2 outputs of a central processing unit (CPU) 10 respectively are connected to a 16-bit address bus 12 and an 8-bit control bus 11. An input/output A1 of CPU 10 is connected to an 8-bit bidirectional data bus 13. In the preferred embodiment disclosed herein, the CPU 10 is a microprocessor chip manufactured and sold by Motorola Semiconductor Products Inc. of Phoenix, Ariz., and identified to the public as CPU M68A00.

The control bus 11 and address bus 12 each are connected to inputs of a decoding logic unit 14. The D1 output of the logic unit is applied by way of a control line 15 to the load input of an 8-bit address register 16.

The D2 output of logic unit 14 is applied to one input of an OR gate 17. A second input to gate 17 is connected to the D3 output of the logic unit, and the output of the gate 17 is connected by way of a control line 18 to the increment input of register 16 and to the enable input of a 16K × 18 bit random access memory (RAM) 19. The D4 output of the logic unit 14 is applied by way of a control line 20 to the load input of an 8-bit address register 21, and the D5 output of the logic unit is applied by way of a control line 22 to the load input of an 8-bit register 23.

The logic unit 14 operates in accordance with the logic truth table set forth in Table 1 below:

TABLE I

| LOGIC TRUTH TABLE | | | | | |
|---|---|---|---|---|---|
| | D1 | D2 | D3 | D4 | D5 |
| WRITE I (Hexidecimal E121) | 1 | 0 | 0 | 0 | 0 |
| WRITE II (Hexidecimal E122) | 0 | 1 | 0 | 0 | 0 |
| WRITE III (Hexidecimal E123) | 0 | 0 | 1 | 0 | 0 |
| WRITE IV (Hexidecimal E120) | 0 | 0 | 0 | 1 | 0 |
| WRITE V (Hexidecimal E125) | 0 | 0 | 0 | 0 | 1 |
| READ I (Hexidecimal E122) | 0 | 1 | 0 | 0 | 0 |
| READ II (Hexidecimal E123) | 0 | 0 | 1 | 0 | 0 |

The read/write functions of Table I shall be further explained in the upcoming description of the operation of the invention.

The data input to register 16 is connected to the data bus 13. The increment enable input to the register 16 is connected to the increment enable input of register 21, and to the bit 0 output of register 23. The 8-bit output of register 16 is applied to the A1 input of RAM 19, and the carry-out output of the register 16 is connected to the increment input of register 21. The bit 0-6 outputs of register 21 are applied to the A2 input of RAM 19. The registers 16 and 21 work in concert to provide a 14-bit address to the RAM 19. Register 16 provides the low order eight bits of the address, and register 21 provides the high order six bits of the address.

The read/write control input to the RAM is connected by way of a control line 24 to the control bus 11. The A0 input/output of RAM 19 is connected to an 8-bit bidirectional bus 25 leading to the data bus 13.

DESCRIPTION OF THE OPERATION

In operation, a memory location of RAM 19 is addressed by first writing address information into the registers 16 and 21. More particularly, the CPU 10 issues a write command on control bus 11, and a hexidecimal E121 on the address bus 12 to identify a WRITE 1 condition to logic unit 14. In response thereto, the D1 output of logic unit 14 transitions to a logic one level to load the address information currently on the data bus 13 into the register 16. The CPU 10 further issues a write command on the control bus 11 in combination with a hexidecimal E120 on the address bus 12 to identify a WRITE IV condition to logic unit 14. The D4 output of the logic unit 14 thereupon transitions to a logic one level to load eight bits of address information on the data bus 13 into the register 21. As before stated, registers 16 and 21 indicate a 14-bit address of a particular memory location in the RAM 19.

Upon loading the registers 16 and 21 with memory address information, the CPU 10 issues a hexidecimal E122 or a hexidecimal E123 to the address bus 12 in combination with either a read or write command on the control bus 11 to cause either the D2 or D3 outputs of logic unit 14 to transition to a logic one level. The leading edge of the logic one output of gate 17 thereupon causes a chip enable at RAM 19 to occur.

Prior to the time that registers 16 and 21 are being loaded with a RAM memory address, the register 23 is loaded with information causing the bit 0 output of the register to transition to a logic one or a logic zero level. More particularly, in the preferred embodiment disclosed herein, CPU 10 issues a write command to control bus 11 and a hexidecimal E125 to the bus 12 to cause the D5 output of logic unit 14 to transition to a logic one level. The register 23 thereupon is loaded with eight bits from the data bus 13, bit 0 of which is an appropriate logic level. If a sequence of RAM 19 memory locations are to be addressed, the bit 0 output is at a logic one level to enable the increment enable inputs of registers 16 and 21. If a single memory location is to be addressed, however, the bit 0 output of register 23 is at a logic zero level.

If the control line 24 is at a logic one level, a write command is indicated to the RAM 19. Eight bits of data on the data bus 13 thereupon is written into the location of the RAM 19 addressed by the registers 16 and 21. Upon the occurrence of the trailing edge of the output of gate 17, the register 16 is incremented to address a next memory location of the RAM 19. The above-described write operation may continue until 16K 8-bit words are written into the RAM 19. The information loaded into the RAM 19 thereafter may be read in response to a change in logic level of the control line 24.

It is to be understood that in the context of this specification, the letter K connotes 1024 locations. Thus, 16K indicates 16,384 locations, and 64K indicates 65,536 locations.

CPU 10 of the preferred embodiment has a capability of addressing 64K memory locations. In the operation of the invention as described above, however, the 16K memory locations of RAM 19 require only five of the 64K addresses which the CPU 10 is capable of generating. The CPU thus may address an additional 65,531 memory locations. Without the invention as disclosed herein, the CPU would be able to address only 49,152 additional memory locations.

A further advantage is realized by combining at the gate 17 both the increment command to the register 16 and the chip enable command to the RAM 19. Such a combination eliminates a CPU cycle which otherwise would be required to increment an internal address register each time a read or a write command is issued.

A random access memory system has been disclosed which substantially extends the memory addressing capacity of a CPU. The memory extension is effected by a logic control system more simplistic in design and requiring less CPU control than known prior memory systems.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A random access memory system for extending the memory addressing capacity of a CPU in a data processing system including a control bus, an address bus and a data bus each in electrical communication with said CPU, said memory system comprising:
    (a) logic decoding means coupled to said control bus and to said address bus, said logic decoding means being operative in response to control words and a minimum number of memory addresses applied to said CPU to said control bus and said address bus, respectively, to generate command signals for controlling either a data read or a data write operation specified by said control words;
    (b) address register means coupled to said logic decoding means and to said data bus, said address register means being conditioned by said command signals to provide memory addresses during both a data read and a data write operation for selectively addressing a single or a series of memory locations and said address register means including:
    first register means coupled to said data bus and to said logic decoding means, said first register means for storing a memory address applied to said data bus by said CPU in response to predetermined ones of said command signals generated by said logic decoding means, said memory address specifying any one of said plurality of memory locations; and,
    second register means coupled to said data bus, to said logic decoding means and to said first register means, said second register means storing a control bit signal applied to said data bus by said CPU in response to another one of said command signals, said control bit signal having first and second states for defining whether a single or series of locations are being accessed,
    said first register means being operative to selectively increment said memory address in accordance with said first and second states of said control signal for providing said memory addresses for addressing said single or series of memory locations; and
    (c) a random access memory coupled to said control bus, said logic decoding means, said address register means and said data bus, said random access memory including a plurality of memory locations and said memory being operative in response to said command signals to store in or supply information from said single or said series of memory locations within said plurality of memory locations specified by said memory addresses received from said first address register means during said data write operation or during said data read operation.

2. The apparatus of claim 1 wherein said system further includes logic circuit means coupled to said logic decoding means, to said random access memory and to said first register means, said logic circuit means for logically combining predetermined ones of said command signals generated by said logic decoding means for enabling said random access memory and incrementing the memory address stored in said first register means during the same memory cycle of operation.

3. The apparatus of claim 2 wherein said logic circuit means is an OR circuit which enables said random access memory in response to the leading edge of each of said predetermined ones of said command signals and conditions said first register means for incrementing in response to the trailing edge of said each of said predetermined ones of said command signals.

4. The apparatus of claim 1 wherein said first register means includes a pair of registers for storing different portions of said memory address applied sequentially to said data bus by said CPU and loaded into each of said pair of registers in response to a different one of said command signals generated by said logic decoding means upon decoding a predetermined one of said minimum number of memory addresses.

5. The apparatus of claim 4 wherein said minimum number of memory addresses corresponds to at least five memory addresses.
* * * * *